United States Patent [19]

Parr

[11] 4,397,522

[45] Aug. 9, 1983

[54] OPTICAL FIBRE CONNECTOR

[75] Inventor: David T. Parr, Croft near Warrington, England

[73] Assignee: BICC Public Limited Company, London, England

[21] Appl. No.: 188,075

[22] Filed: Sep. 17, 1980

[51] Int. Cl.³ .............................................. G02B 7/26
[52] U.S. Cl. ........................ 350/96.21; 285/DIG. 6
[58] Field of Search .............. 350/96.21, 320; 29/447; 285/41, 381, DIG. 6; 403/273

[56] References Cited

U.S. PATENT DOCUMENTS

| 4,019,241 | 4/1977 | Logan | 350/96.21 X |
| 4,047,796 | 9/1977 | Kao et al. | 350/96 |
| 4,050,783 | 9/1977 | Tardy | 350/96.21 |

FOREIGN PATENT DOCUMENTS 2406210 10/1977 France.
1524751 6/1976 United Kingdom.

*Primary Examiner*—Paul L. Gensler
*Attorney, Agent, or Firm*—Buell, Blenko, Ziesenheim & Beck

[57] ABSTRACT

In an optical fiber connector component including a tubular housing and three round rods supported longitudinally side by side within the tubular housing and defining between them an intersticial space for reception of an optical fibre or optical fibres, the tubular housing is of a material having a greater coefficient of thermal expansion than that of the material of the rods. In use, prior to introducing optical fibre into the intersticial space, the tubular housing is heated to cause it to expand radially outwardly to permit radial separation of the rods and introduction of the optical fibre into the intersticial space. The tubular housing is then cooled or permitted to cool to cause the housing to contract radially inwardly to compress the rods inwardly and cause them to grip the optical fiber so that it is aligned axially in the intersticial space.

12 Claims, 1 Drawing Figure

U.S. Patent  Aug. 9, 1983  4,397,522
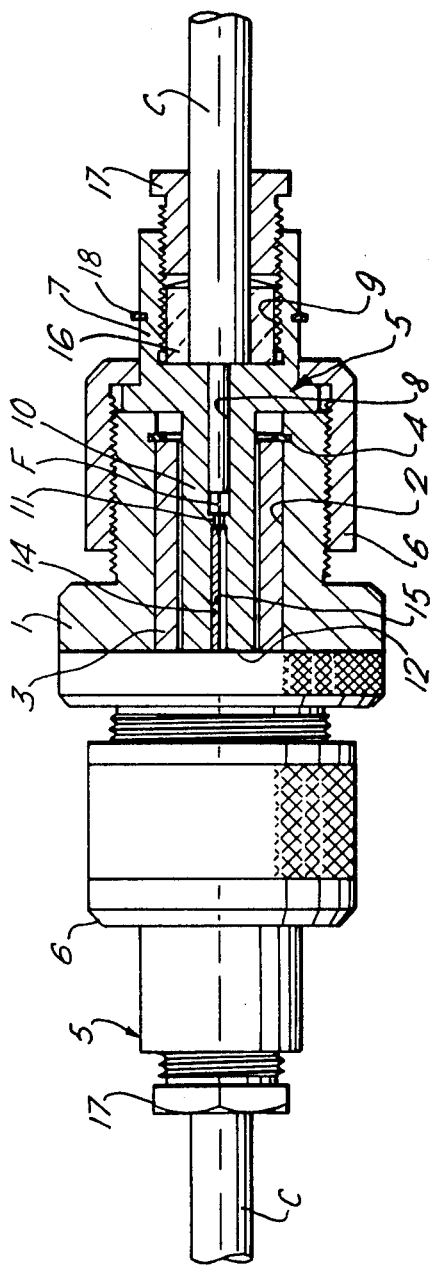

OPTICAL FIBRE CONNECTOR

This invention relates to an optical fibre connector for connecting two optical fibres end to end.

More particularly, the invention is concerned with optical fibre connector components of the kind including an elongate tubular housing, at least three elongate members of substantially the same cross-sectional shape and size as one another supported longitudinally side by side within the tubular housing and having adjacent arcuate surfaces which bound between them an intersticial space into which an end part of at least one optical fibre can be inserted and, associated with the elongate members, means for compressing the elongate members about the optical fibre or optical fibres to align the optical fibre along and secure it in the intersticial space. An optical fibre connector component of the aforesaid kind will be hereinafter referred to as "of the kind described."

In one method of employing an optical fibre connector component of the kind described, end parts of two optical fibres to be connected are inserted into opposite ends of the intersticial space until their neighbouring end faces abut. In another method of employing an optical fibre connector component of the kind described, one of two optical fibres to be connected is inserted in the intersticial space of one of two connector components of a multi-part connector and the other of said optical fibres is inserted in the intersticial space of the other connector component, the two connector components being drawn together axially until the optical fibres therein substantially abut.

We have found that, when using optical fibre connector components of the kind described that have hitherto been proposed, it is difficult to insert an optical fibre into the intersticial space bounded by the elongate elements without risk of damaging the end face of the optical fibre to such an extent as to reduce substantially the efficiency of the optical coupling between two fibres when they are caused to abut.

It is an object of the present invention to provide an improved method of, and an improved optical fibre connector component of the kind described for use in, connecting two optical fibres end to end, which method and connector component substantially reduce the risk of damage to an end face of an optical fibre during introduction of the fibre into the intersticial space bounded by the elongate members of the connector component.

In the improved method according to the invention, the tubular housing of an optical fibre connector component of the kind described which is to be employed is of a material having a substantially greater coefficient of thermal expansion than that of the material of the elongate members in the tubular housing and, prior to introducing an optical fibre into the intersticial space bounded by the elongate members, the tubular housing is heated to a temperature sufficient to cause the housing to expand radially outwardly to permit radial separation of the elongate members and so facilitate insertion of an optical fibre into an end of the intersticial space and, after at least one optical fibre has been so inserted, the tubular housing is cooled or is permitted to cool to cause the housing to contract radially inwardly to compress the elongate members inwardly and cause them to grip the optical fibre in such a way that it is aligned substantially axially in the intersticial space.

Preferably, heating of the tubular housing is so effected that substantially the whole of the housing surrounding the elongate members is raised to the same temperature and, preferably also, the housing is so cooled, or is permitted to cool in such an environment, that radially inward contraction of the tubular housing is substantially uniform throughout its circumference and throughout at least that part of the length of the housing surrounding the elongate members.

We have found that the differential contraction of the tubular housing and elongate members is such that sufficient pressure is imparted by the elongate members on the optical fibre to hold it in position in the intersticial space with substantially no micro-bending losses.

The invention also includes an optical fibre connector component of the kind described in which the tubular housing is of a material having a substantially greater coefficient of thermal expansion than that of the material of the elongate members in the tubular housing.

Preferably, the internal surface of at least that part of the bore of the tubular housing in which the elongate members are positioned is substantially parallel to and concentric with the outer surface of said part of the tubular housing. Preferably also, each of the elongate members positioned in said part of the tubular housing has an outer surface that is substantially parallel to the internal surface of said part of the bore of the housing. Where, as is preferred, each elongate member is of circular cross-section, the internal and external surfaces of the tubular housing each has a cross-section of substantially circular form. At at least one end of each elongate member, the diameter of the member may decrease smoothly towards said end so that, at said end, the intersticial space has a mouth which facilitates initial insertion of an optical fibre into the intersticial space.

Preferably, the tubular housing and the elongate members are of a metal or metal alloy and where, as is preferred, the elongate members are of an iron/nickel alloy, such as that sold under the trade name Invar, preferably the tubular housing is of brass, stainless steel or other metal or metal alloy having a hard-wearing surface.

The optical fibre connector component of the present invention is especially, but not exclusively, suitable for use as a component part of a multi-part connector.

A preferred multi-part optical fibre connector comprises a tubular body, two optical fibre connector components of the present invention for insertion into opposite ends of the bore of the tubular body and, associated with the tubular body, means for urging said connector components axially towards one another to cause their end faces to abut.

The means for urging the connector components towards one another may comprise two gland nuts, one at each end of the tubular body, which are in screw-threaded engagement with the tubular body.

The invention will be further illustrated by a description, by way of example, of a preferred multi-part optical connector for connecting two optical fibres end to end, with reference to the accompanying drawing which shows a side view, partly in section and partly in elevation, of the connector.

Referring to the drawing, the optical connector comprises a tubular body 1 of brass having a bore 2 which is lined by a two-part hollow core 3 of steel which has a bore of approximately square cross-section and which is held in position between two longitudinally spaced circlips 4, one of which is not shown. In slidable engagement in opposite ends of the bore of the core 3, are two connector components 5 each of which is urged axially towards the other by an internally screw-threaded gland nut 6 which screws on to an end part of the tubular body 1.

Each connector component 5 comprises a body 7 of brass having a throughbore which is stepped at an intermediate position between its ends to form a part 8 of smaller diameter and a part 9 of larger diameter. The part 10 of the body 7 bounding the smaller part 8 of the bore constitutes the tubular housing of the connector component and has internal and external surfaces of circular cross-section.

At an intermediate position in the smaller part 8 of the bore of the body 7 is a radially inwardly extending shoulder 11, and housed in the part 8 of the bore between this shoulder and the end face 12 of the tubular housing 10, are three elongate members 14 of Invar, each of substantially circular cross-section, defining between them an intersticial space 15. At the end of each of the elongate members 14 remote from the end face 12 of the tubular housing 10, the diameter decreases smoothly towards said end so that, at that end, the intersticial space 15 bounded by the elongate members has a mouth for facilitating insertion of an optical fibre. The other ends of the elongate members 14 are flush with the end face 12 of the tubular housing 10.

The larger part 9 of the bore of the body 7 is internally screw-threaded and houses a sealing washer 16 of resilient material and an externally screw-threaded nut 17 which is in screw-threaded engagement with the body. A circlip 18 at an intermediate position along the length of the body 7 serves to retain the gland nut 6 on the body 7 when the gland nut is not in screw threaded engagement with the tubular body 1.

In using the optical connector shown in the drawing to connect two optical fibres end to end, before introducing each connector component 5 into the tubular body 1, the body 7 of each connector component is heated to a temperature sufficient to cause the tubular housing 10 to expand radially outwardly to permit radial separation of the elongate members 14. In the meantime, one end of one of two optical cables C whose optical fibres are to be connected has been cut back to expose the fibre F and the end face of the fibre has been polished. The cut back end of the optical cable C is then introduced into the larger part 9 of the bore of the heated body 7 and the optical fibre F is introduced into the intersticial space 15 between the elongate members 14 until the end face of the fibre is flush with the end face 12 of the tubular casing 10 and the cut back end of the cable sheath abuts the step in the bore. The nut 17 is then tightened to compress the sealing washer 16 radially inwardly between the step in the bore and the nut to effect a substantially fluid-tight seal and the body 7 is then permitted to cool to cause the tubular housing 10 to contract radially inwardly to compress the elongate members 14 inwardly and cause them to grip the optical fibre F in such a way that it is aligned substantially axially in the intersticial space 15.

After each connector component 5 has been secured to an end of one of the two optical cables C, the two connector components are introduced into opposite ends of the tubular body 1 and the gland nuts 6 are tightened until the end faces 12 of the tubular housings 10, and hence the end faces of the optical fibres F, abut in substantially axial alignment.

What I claim as my invention is:

1. A method of connecting two optical fibres end to end using two optical fibre connector components each of the kind including an elongate tubular housing, at least three elongate members of substantially the same cross-sectional shape and size as one another supported longitudinally side by side within the tubular housing and having adjacent arcuate surfaces which bound between them an intersticial space into which an end part of an optical fibre can be inserted and, associated with the elongate members, means for compressing the elongate members about the optical fibre to align the optical fibre along and secure it in the intersticial space, each tubular housing of the optical fibre connector component being of a metal or metal alloy having a substantially greater coefficient of thermal expansion than that of the material of the elongate members in the tubular housing, which method comprises the steps of heating each tubular housing to a temperature sufficient to cause the housing to expand radially outwardly to permit radial separation of the elongate members and so facilitate insertion of an optical fibre into an end of the interstitial space bounded by the elongate members, introducing an optical fibre into the interstitial space of each heated tubular housing, cooling the tubular housing or permitting the tubular housing to cool to cause the housing to contract radially inwardly to compress the elongate members inwardly and cause them to grip the optical fibre in such a way that it is aligned substantially axially in the interstitial space, inserting the optical fibre connector components into opposite ends of the bore of a tubular body; and urging the connector components axially towards one another until said optical fibres therein substantially abut.

2. A method as claimed in claim 1, wherein heating of the tubular housing is so effected that substantially the whole of the housing surrounding the elongate members is raised to the same temperature.

3. A method as claimed in claim 1 or 2, wherein the housing is so cooled, or is permitted to cool in such an environment, that radially inward contraction of the tubular housing is substantially uniform throughout its circumference, and throughout at least that part of the length of the housing surrounding the elongate members.

4. An optical fibre connector component of the kind including an elongate tubular housing, at least three elongate members of substantially the same cross-sectional shape and size as one another supported longitudinally side by side within the tubular housing and having adjacent arcuate surfaces which bound between them an intersticial space into which an end part of at least one optical fibre can be inserted and, associated with the elongate members, means for compressing the elongate members about the optical fibre to align the optical fibre along and secure it in the intersticial space, wherein the elongate members are of a metal or metal alloy and the tubular housing is of a metal or metal alloy different from, and having a substantially greater coefficient of thermal expansion than that of the metal or metal alloy of the elongate members.

5. An optical fibre connector component as claimed in claim 4, wherein the internal surface of at least that part of the bore of the tubular housing in which the elongate members are positioned is substantially parallel to and concentric with the outer surface of said part of the tubular housing.

6. An optical fibre connector component as claimed in claim 4 or 5, wherein each of the elongate members positioned in said part of the tubular housing has an outer surface that is substantially parallel to the internal surface of said part of the bore of the housing.

7. An optical fibre connector component as claimed in claim 4, wherein each elongate member is of circular cross-section and the internal and external surfaces of the tubular housing each has a cross-section of substantially circular form.

8. An optical fibre connector component as claimed in claim 7, wherein at at least one end of each elongate member, the diameter of the member decreases smoothly towards said end.

9. An optical fibre connector component as claimed in claim 4, wherein the elongate members are of an iron/nickel alloy and the tubular housing is of brass or stainless steel.

10. A multi-part optical fibre connector comprising a tubular body, two optical fibre connector components as claimed in claim 4, for insertion into opposite ends of the bore of the tubular body, and, associated with the tubular body, means for urging said connector components axially towards one another to cause their end faces to abut.

11. A multi-part optical fibre connector as claimed in claim 10, wherein the means for urging the connector components towards one another comprises two gland nuts, one at each end of the tubular body, which are in screw threaded engagement with the tubular body.

12. A method of connecting two optical fibres end to end using an optical fibre connector component of the kind including an elongate tubular housing, at least three elongate members of substantially the same cross-sectional shape and size as one another supported longitudinally side by side within the tubular housing and having adjacent arcuate surfaces which bound between them an intersticial space into which end parts of two optical fibres can be inserted and, associated with the elongate members, means for compressing the elongate members about the optical fibres to align each optical fibre along and secure it in the intersticial space, the tubular housing of the optical fibre connector component being of a metal or metal alloy having a substantially greater coefficient of thermal expansion than that of the material of the elongate members in the tubular housing, which method comprises the steps of heating the tubular housing to a temperature sufficient to cause the housing to expand radially outwardly to permit radial separation of the elongate members and so facilitate insertion of optical fibres into opposite ends of the intersticial space bounded by the elongate members; introducing optical fibres into opposite ends of the intersticial space of the heated tubular housing until the optical fibres substantially abut; and cooling the tubular housing or permitting the tubular housing to cool to cause the housing to contract radially inwardly to compress the elongate members inwardly and cause them to grip the optical fibres in such a way that they are aligned substantially axially in the intersticial space.

* * * * *